United States Patent Office 3,040,308
Patented June 19, 1962

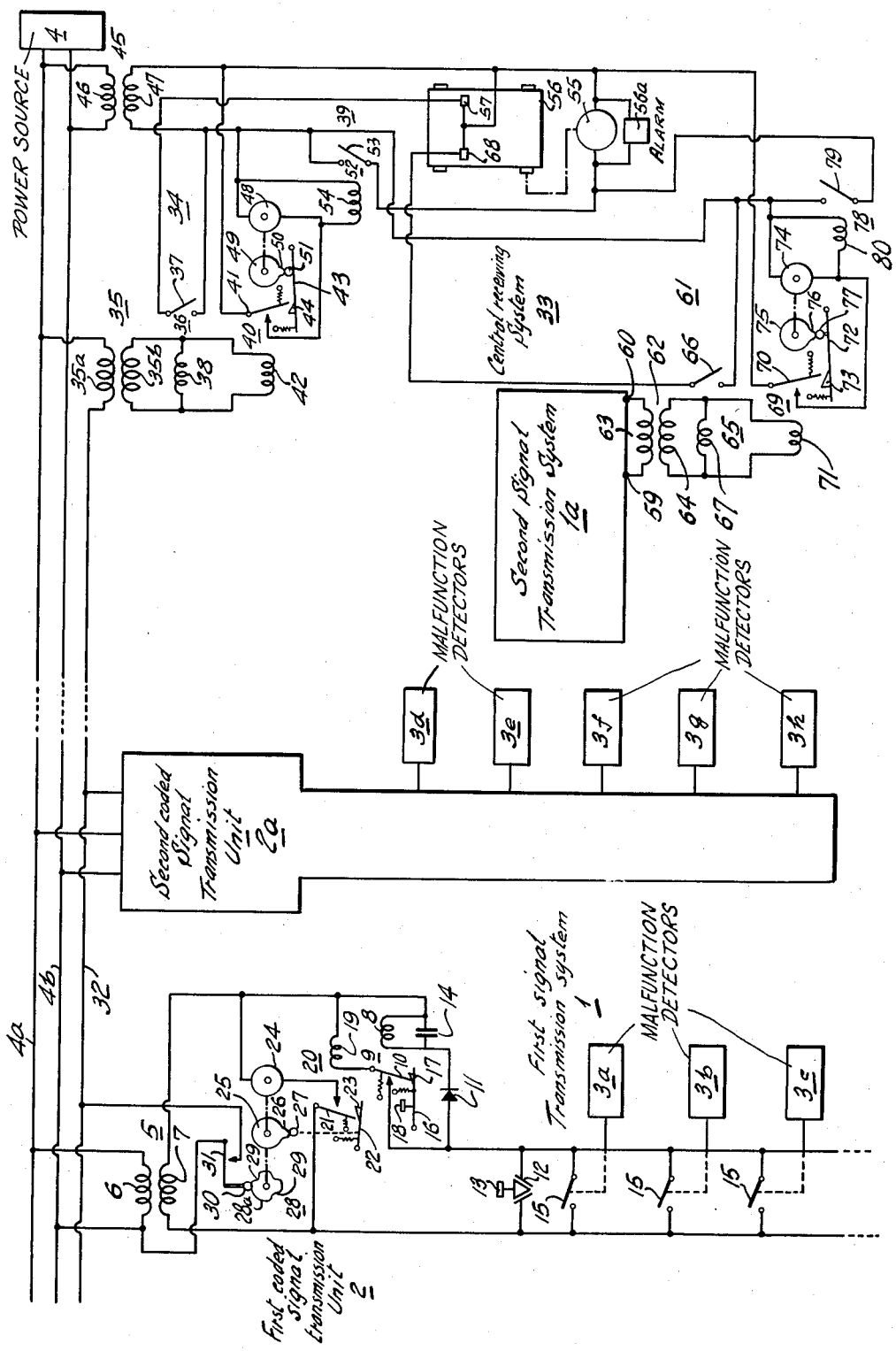

3,040,308
MONITORING SYSTEMS
Laurence M. Hubby, Bellaire, Tex., assignor to Texaco Inc., a corporation of Delaware
Filed July 31, 1957, Ser. No. 675,328
8 Claims. (Cl. 340—213)

This invention relates to monitoring systems and more particularly to monitoring systems for use in petroleum production or oil field operations.

In oil field operations a technician called a pumper is employed to periodically inspect the various installations operating in or near an oil field in order to produce the wells economically and efficiently. It is the duty of the pumper to inspect equipment from the well head to the customer's pipeline to detect malfunctioning units in the oil production systems. At each well site in an oil field the pumper must periodically inspect, for example, the flow line pressure, the stuffing box, and the oil level in the pump engine, and at the tank battery equipment he must inspect the oil level and pressure in the separator, the temperatures in the heater treaters, the level in the oil storage tanks and the stuffing box and oil level in the pumping apparatus.

It can readily be seen that an inspection of these elements in the well and tank battery equipment is very time consuming, especially when the oil production equipment is scattered over an area which may include hundreds of square miles. In the past regardless of whether or not the well and tank battery equipment was functioning properly each of the above-mentioned elements had to be inspected at its location in order to determine whether or not the equipment was in proper operating condition.

In accordance with the present invention a monitoring system is provided which permits a pumper to determine from one point or location whether equipment located at any one of a plurality of scattered points or locations is malfunctioning or inoperative. The monitoring system includes means for transmitting a signal from a signal transmission unit actuated by a detecting device disposed in the petroleum equipment to a central receiving system when the equipment is malfunctioning or inoperative. The signal may be permanently recorded and if desired may simultaneously produce a sensory signal, for example, an audible or visible signal at any point in the system.

Consequently, it is an object of this invention to provide a system adapted for use in petroleum production monitoring, that is simple in construction and reliable in operation, while at the same time is adequate in its indication of conditions that are to be monitored at any given remote station.

Briefly, the invention concerns a petroleum production monitoring system. The system comprises a detecting device, and a signal transmission unit. The signal transmission unit includes switching means responsive to said detecting device, and a source of electrical energy, as well as a time delay relay connected across said source of energy through said switching means. The time delay relay has a normally closed switch. The signal transmission unit also includes a cam timer relay connected across the source through said normally closed switch and said switching means. The said timer relay has a normally open switch. The signal transmission unit also includes a cam timer motor connected across said source through said normally open switch, and a coded cam switch coupled to said cam timer motor and adapted to produce a coded signal. The signal transmission unit also includes a signal transmission line coupled to said coded cam switch. The system also comprises a central receiving system coupled to said transmission line and including means for recording a coded signal.

In order that the invention may be more clearly understood and readily carried into effect it will be described more fully with reference to the accompanying drawing in which the figure diagrammatically illustrates a monitoring system in accordance with the invention.

Referring to the figure in more detail there is shown a circuit diagram, partly in block form, of the oil production monitoring or warning system which comprises a signal transmission system 1 including a first coded signal transmission unit 2 and a plurality of detecting devices 3a, 3b and 3c which are associated with or connected to well production equipment located at a producing well. These detecting devices 3a, 3b and 3c may be conventional devices such as appropriate gages for detecting for example high or low flow line pressure, a leaking stuffing box, such as that disclosed in copending U.S. application filed by N. G. Kitrell and H. E. Pietschker, now Patent No. 2,915,975, or low oil level in pumping apparatus, which devices are each suitably adapted to actuate means in the transmission unit 2 to render the unit 2 operative. The coded signal transmission unit 2 comprises a source of power 4, for example alternating current, which is transmitted through power lines 4a and 4b to a transformer 5 having a primary winding 6 and a secondary winding 7. Connected serially across the secondary winding 7 is the coil 8 of a time delay latching relay 9 having a normally closed switch 10, a thermionic or semi-conductor diode 11 and a manually operated switch 12 having a test push button 13. A capacitor 14 is connected across coil 8 of the time delay relay 9. A plurality of switching devices 15 may be connected in parallel with the manually operated switch 12. A different one of said plurality of detecting devices 3a, 3b, 3c is connected to each of the switching means 15. The time delay latching relay 9 also includes a spring biased pivoted lever 16 having a detent 17 and a reset button 18 thereon. The coil 19 of a cam timer latching relay 20 having a normally open switch 21 is connected across the secondary winding 7 of transformer 5 through the normally closed switch 10 of the time delay relay 9 and the plurality of switching devices 15. The cam timer latching relay 20 also includes a spring biased pivoted lever 22 having a detent 23 thereon. A cam timer motor 24 is also connected across the secondary winding 7 of transformer 5 through the normally open switch 21 of cam timer latching relay 20. A control cam 25 having a projection 26 thereon is coupled to the cam timer motor 24. A roller or cam follower 27 disposed in contact with the edge of the control cam 25 is connected to the spring biased pivoted lever 22 of the cam timer latching relay 20. A coded cam switch 28 comprises a cam 28a having a plurality of notches 29 therein coupled to the cam timer motor 24, and a roller 30 adapted to ride on the edge of said notched cam 28a and a switch 31 mechanically connected to the roller 30. The switch 31 is electrically connected between one power line 4b and a signal transmission line 32.

The first signal transmission system 1 of the oil field monitoring system of the invention may include a second coded signal transmission unit 2a connected, for example, to the tank battery equipment, which unit 2a is similar in all respects to the coded signal transmission unit 2 except that the cam of its coded cam switch has differently placed notches or notches of different length than the notches of coded cam switch 28 to produce a different coded signal. The tank battery equipment may include a plurality of detecting devices 3d, 3e, 3f, 3g and 3h, which may be provided to detect respectively, a high level in a tank, high level in a separator, a high or low pressure in a separator, high or low temperature in a treater and a leaking pump stuffing box. The second coded signal transmission unit 2a may be coupled to the same power lines 4a, 4b and signal transmission line 32 to which the first coded signal transmission unit 2 was coupled.

The oil field monitoring system of this invention further comprises a central receiving system 33 physically located preferably centrally with respect to oil production equipment to which the monitoring system is connected. This receiving system 33 includes a first receiving unit 34 having a transformer 35 which has a primary winding 35a connected between the signal transmission line 32 and the power line 4a and a secondary winding 35b, and a signal relay 36 having a normally open switch 37 and a coil 38 connected in parallel with the secondary winding 35b of the transformer 35.

The monitoring system also includes a recording device 39 having a cam timer latching relay 40 which includes a normally open switch 41, a coil 42 connected in parallel with the secondary winding 35b of the transformer 35 and a spring biased pivoted lever 43 having a detent 44 thereon. The recording device 39 further includes a transformer 45 having a primary winding 46 connected to power source 4 and a secondary winding 47. A cam timer motor 48 is connected across the secondary winding 47 of transformer 45 through the normally open switch 41 of cam timer latching relay 40. A control cam 49 having a projection 50 thereon is connected to the cam timer motor 48. A roller 51 connected to the spring biased pivoted lever 43 of the cam timer latching relay 40 is adapted to continuously engage the edge of cam 49. A motor relay 52 having a normally open switch 53 has its coil 54 connected across the cam timer motor 48. A motor 55 mechanically coupled to a strip chart 56 is electrically connected across the secondary winding 47 of transformer 45 through the normally open switch 53 of motor relay 52. If desired an audible or visible signaling device or alarm 56a may be connected across chart drive motor 55. A writing instrument 57, for example, a conventional recorder pen, is disposed in contact with the strip chart 56 and is electrically connected across the secondary winding 47 of transformer 45 through the normally open switch 37 of signal relay 36.

In areas where extensive oil producing operations are conducted a second signal transmission system 1a similar to the first signal transmission system 1 may be provided. This second transmission system 1a has signal output terminals 59 and 60. To receive the coded signals from the transmission system 1a, the central receiving system 33 is provided with a second receiving unit 61. This receiving unit 61 includes a transformer 62 having a primary winding 63 connected between the output terminal 59 and 60 of the second transmission system 1a in the same manner as secondary winding 35a of transformer 35 is connected to the first transmission system 1. The second receiving unit transformer 62 further includes a secondary winding 64. A signal relay 65 having a normally open switch 66 has its coil 67 connected in parallel with the secondary winding 64 of transformer 62.

In order to record the coded signals from the second transmission system 1a on the common strip chart 56 of the recording device 39 independently of the coded signals produced by the first signal transmission system 1, a second writing instrument 68 similar to the first writing instrument 57 is provided. The second writing instrument 68 is connected across the secondary winding 47 of transformer 45 through the normally open switch 66 of the signal relay 65. In order to energize the chart drive motor 55 during the time of reception of coded signals by the second receiving unit 61, a cam timer latching relay 69 is provided. This relay 69 has a normally open switch 70, a coil 71 connected in parallel with the secondary winding 64 of transformer 62 and a spring biased pivoted lever 72 having a detent 73 thereon. A cam timer motor 74 is connected across the secondary winding 47 of transformer 45 through the normally open switch 70 of the cam timer latching relay 69. A control cam 75 having a projection 76 thereon is connected to the cam timer motor 74. A roller 77 connected to the spring biased pivoted lever 72 is adapted to move along the edge of control cam 75. A second motor relay 78 having a normally open switch 79 has its coil 80 connected across the cam timer motor 74. The normally open switch 79 of the second motor relay 78 is connected in parallel with switch 53 of the first motor relay 52.

In the operation of the petroleum production monitoring system, when one of the detecting devices 3a, 3b or 3c coupled to the first coded signal transmission unit 2 detects a malfunctioning element in the well equipment its associated switching means 15 closes. The closed switching means 15 completes the circuit from one terminal of the secondary winding 7 of transformer 5 through the rectifier or diode 11 and the parallel combination of the capacitor 14 and the coil 8 of time delay latching relay 9 to the other terminal of the secondary winding 7 of transformer 5. The closed switching means 15 also completes the circuit from one terminal of the secondary winding 7 of transformer 5 through the closed switch 10 of time delay relay 8 and the coil 19 of cam timer latching relay 20 to the other terminal of the secondary winding 7. Therefore, as soon as one of the switching means 15 is closed the cam timer latching relay 20 is energized and switch 21 of this relay is closed and held in the closed position by the detent 23 on the spring biased pivoted lever 22 which energizes the cam timer motor 24. The diode 11 rectifies the voltage produced at the secondary winding 7 of transformer 5 which tends to build up a direct current voltage across capacitor 14. After the voltage across 14 is built up to a certain value it produces a current in the coil 8 of the time delay latching relay 9 of sufficient strength to operate switch 10 and hence to deenergize the cam timer latching relay 20. The time delay for relay 9 may be for a period of time of about 4 or 5 seconds, but in any event the period of time must be greater than the cam timer latching relay 20 pull-in time. After the time delay latching relay 9 operates the normally closed switch 10, the switch 10 is held in the open position by the detent 17 on spring biased pivoted lever 16. Time delay latching relay 9 will not again operate until it is manually reset by actuating reset knob 18. When not in motion, projection 26 on control cam 25 is positioned to hold roller 27 in its lowermost position depressing spring biased pivoted lever 22 so that normally open switch 21 of the cam timer relay is not restrained by the detent 23 of lever 22 in any way. After the switch 21 closes and cam timer motor 24 is energized the projection 26 on the cam is rotated on the roller 27 then moves to its uppermost position to permit the detent 23 on lever 22 to lock the switch 21 of the cam timer relay in its closed position. Therefore, even though cam timer latching relay 20 may be energized for only 4 or 5 seconds the cam timer motor 24 will continue to be energized during the period of time in which control cam 26 makes one complete revolution. When the single revolution or cycle of the control cam 26 is completed the projection 26 again forces the roller 27 downward to its lowermost position which in turn depresses the spring biased pivoted lever 22 to permit switch 21 of cam timer latching relay 20 to open and thus to deenergize the cam timer motor 24. During the interval of time when the cam timer motor 24 is energized the notched cam 28a of coded cam switch 28 is rotated to produce a predetermined coded signal. The code may be set up by making a number of notches or groups of notches along the edge of the cam 28a. One of the groups of notches on the cam 28a may identify a particular oil field and another of the groups may identify a particular well in the field. Switch 31 is normally in the open position but closes each time the roller 30 falls into a notch 29 in the cam 28a to produce an electric pulse which may be readily received by the first receiving unit 34 of the central receiving system 33.

Each time that the switch 31 of the first transmission unit 2 closes current passes through the primary winding 35a of the transformer 35 of the first receiving unit 34 which sets up a voltage in the secondary winding 35b and which in turn energizes signal relay 36 and cam timer latching relay 40. When the first pulse of the coded signal energizes the cam timer relay 40 the normally open switch 41 of this relay 40 closes and is held in the closed position by the detent 44 of the pivoted lever 43. When switch 41 closes cam timer motor 48 is energized and drives control cam 49 to control the movement of the lever 43 in a manner similar to that of lever 22 by control cam 25. It can be readily seen that if the revolving rate of control cam 49 of the recording device 39 is the same as that of control cam 25 of transmission unit 2 their respective driving motors 48 and 24 will be energized for the same time interval, however the time interval for motor 48 will not begin until a first pulse of the coded signal is received from the transducer unit 2. Since the coil 54 of motor relay 52 is connected across motor 48, relay 52 and hence strip chart drive motor 55 are energized only during the motor 48 energizing time interval, hence the strip chart is in motion only during intervals of time when a coded signal is being received. The pulses of the coded signal which energize the signal relay 36 are recorded on the strip chart 56 by closing switch 37 during intervals corresponding to the coded signal pulse duration intervals to energize the writing instrument 57.

Other coded signals produced by the second coded signal transmission unit 2a having a code different from the first coded signal to identify other producing well or tank battery equipment may also be received by the first receiving unit and recorded by writing instrument 57 on strip chart 56. It can readily be seen that there can be a large number of coded signal transmission units each transmitting a different coded signal to the first receiving unit 34.

In the extensive petroleum production areas or in areas where there is a high frequency of detections of malfunctioning equipment by appropriate detecting devices the second signal transmission system 1a is provided to transmit signals which may have similar or difference codes than those in the first signal transmission system 1. The signals from the second transmission system 1a are received by the second receiving unit 61 and recorded on strip chart 56 by means of the second writing instrument 68. The chart drive motor 55 is controlled by the cam timer latching relay 69, the cam timer motor 74, control cam 75 and motor relay 78 in a manner similar to the control of motor 55 by cam timer latching relay 40, cam timer motor 48, control cam 49 and motor relay 52 of the first receiving unit as hereinbefore described. Although only two signal transmission systems 1 and 1a are illustrated in the figure it should be understood that strip chart 56 may be used to record coded signals produced by a large number of signal transmission systems in the manner described in connection with the first and second signal transmission systems.

It should also be understood that the three lines, namely, power lines 4a and 4b and signal transmission line 32, interconnecting the transmission and receiving systems may be incorporated in a cable of a type which can be buried beneath the surface of the earth. Furthermore, it should be understood that separate electrical power sources may be provided at each of the transmission and receiving systems, the three wire transmission system eliminated and the coded signals transferred by a conventional radio system.

Control cams 25, 49 and 75 are illustrated and described as single cycle cam timers, however the cams may define time intervals which are less than a complete cycle by providing the cam with more than one projection.

Although not shown, each of the detecting devices 3a–h may, in addition to being connected to the switching means 15, be coupled to means for automatically shutting down the entire malfunctioning equipment to avoid serious damage to the equipment or loss of petroleum.

Accordingly, it can be readily seen that malfunctioning equipment can be readily identified by a pumper merely by periodically inspecting chart 56. With the use of this system it is not necessary for a pumper to regularly inspect all equipment that may be used in or about an oil field. In accordance with this invention it is only necessary for the pumper to inspect and repair the equipment identified by coded signals on the centrally located chart 56. This system has been successfully used by one pumper to monitor the operations of 75 widely scattered oil producing wells and six tank batteries, additional well and tank batteries can be easily added to the system.

Obviously, many modifications and variations of the invention as hereinabove set forth may be made without departing from the spirit and scope thereof and therefore only such limitations should be made as are indicated in the appended claims.

I claim:

1. A petroleum production monitoring system comprising a detecting device for determining abnormal conditions, a signal transmission unit including switching means responsive to said detecting device, a source of electrical energy, a time delay relay connected across said source of energy through said switching means, said time delay relay having a normally closed switch, a cam timer relay connected across said source through said normally closed switch and said switching means, said timer relay having a normally open switch, a cam timer motor connected across said source through said normally open switch, a coded cam switch coupled to said cam timer motor and adapted to produce a coded signal and a signal transmission line coupled to said coded cam switch, and a central receiving system coupled to said transmission line and including means for recording the coded signals.

2. A monitoring system as set forth in claim 1 wherein said time delay relay and said cam timer relay are latching relays and wherein said signal transmission unit further includes a control cam adapted to be driven by said cam timer motor and connected to said cam timer latching relay.

3. A monitoring system as set forth in claim 1 wherein said central receiving system comprises a source of electric energy, a chart, a writing instrument adapted to write on said chart, a motor adapted to drive said chart, a first switching means responsive to said coded signal and connected serially with said chart drive motor across said source of energy and second switching means responsive to said coded signal and connected serially with said writing instrument across said source of energy.

4. A monitoring system as set forth in claim 1 wherein said central receiving system comprises a signal relay coupled to said transmission line, said signal relay having a normally opened switch, a second cam timer relay coupled to said transmission line, said cam timer relay having a normally opened switch, a source of electric energy, a second cam timer motor connected across said source through said normally opened cam timer relay switch, a motor relay connected across said cam timer motor, said relay having a normally opened switch, a strip chart, a chart drive motor connected across said source of energy through said normally opened cam timer switch, a recorder pen adapted to write on said strip chart, said pen being connected across said source through said normally opened signal relay switch.

5. A monitoring system as set forth in claim 4 wherein said second cam timer relay is a latching relay and wherein said central receiving system further includes a control cam adapted to be driven by said second cam timer motor and connected to said second cam timer latching relay.

6. A monitoring system as set forth in claim 4 further including at least one additional detecting device and at least a second signal transmission unit coupled to said central receiving system, said second unit including switching means responsive to said additional detecting device, each of the said coded signal transmission units being adapted to transmit a different coded signal.

7. A petroleum production monitoring system comprising a signal transmission system including a detecting device and a coded signal transmission unit responsive to said detecting device, said coded signal transmission unit comprising a source of electric energy, a time delay latching relay, said relay including a coil, a normally closed switch, a capacitor connected across said coil and a rectifier, switching means serially connected with said rectifier and said capacitor across said source, a cam timer latching relay having a normally opened switch and a coil connected across said source through said normally closed time delay relay switch and said switching means, a cam timer motor connected across said source through said normally opened cam timer relay switch, means including a control cam coupled to said cam timer motor for deenergizing said motor after a given interval of time and a coded cam switch coupled to said cam timer motor for producing a predetermined coded signal, a receiving unit adapted to receive said predetermined coded signal, said receiving unit comprising a signal relay having a normally open switch, said signal relay being responsive to said predetermined coded signals and a recorder comprising a cam timer latch relay having a normally opened switch, said cam timer relay being responsive to the first pulse of said predetermined coded signal, a source of electric energy, a cam timer motor connected across said source through said normally opened cam timer relay switch, means including a control cam coupled to said cam timer motor for deenergizing said cam timer motor after a given interval of time, a motor relay having a normally opened switch and a coil connected across said cam timer motor, a chart, a motor coupled to drive said chart and electrically connected across said source of electric energy through said normally opened relay switch, and a writing instrument adapted to mark said chart, said instrument being connected across said source of electric energy through said normally opened signal relay switch.

8. A monitoring system as set forth in claim 7 further including a second signal transmission system, a second receiving unit adapted to receive the signals from said second transmission system, and wherein said recorder further includes a second cam timer latching relay having a normally opened switch, said relay being responsive to the first impulse of the signals from said second transmission system, a second cam timer motor connected across said source of electric energy through said normally opened second cam timer relay switch, means including a control cam coupled to said second cam timer for de-energizing said motor after a given interval of time, a second motor relay having a normally opened switch, said relay being connected across said second cam timer motor, said normally opened second motor relay switch being serially connected with said chart drive motor across said source of electric energy, and a second writing instrument adapted to mark said chart, said second writing instrument being responsive to the output of said second receiving unit.

References Cited in the file of this patent
UNITED STATES PATENTS

| | | |
|---|---|---|
| 1,140,471 | McFell | May 25, 1915 |
| 2,181,728 | Greentree | Nov. 28, 1939 |
| 2,334,827 | Lyons | Nov. 23, 1943 |
| 2,375,238 | Muether | May 8, 1945 |
| 2,605,334 | Hines | July 29, 1952 |
| 2,644,934 | Grant | July 7, 1953 |
| 2,691,127 | Oliwa | Oct. 5, 1954 |
| 2,771,596 | Bellamy | Nov. 20, 1956 |
| 2,899,674 | Sierer | Aug. 11, 1959 |
| 2,937,369 | Newbold | May 17, 1960 |